J. M. W. KITCHEN.
HEATING SYSTEM.
APPLICATION FILED MAR. 13, 1907.
1,024,788.
Patented Apr. 30, 1912.
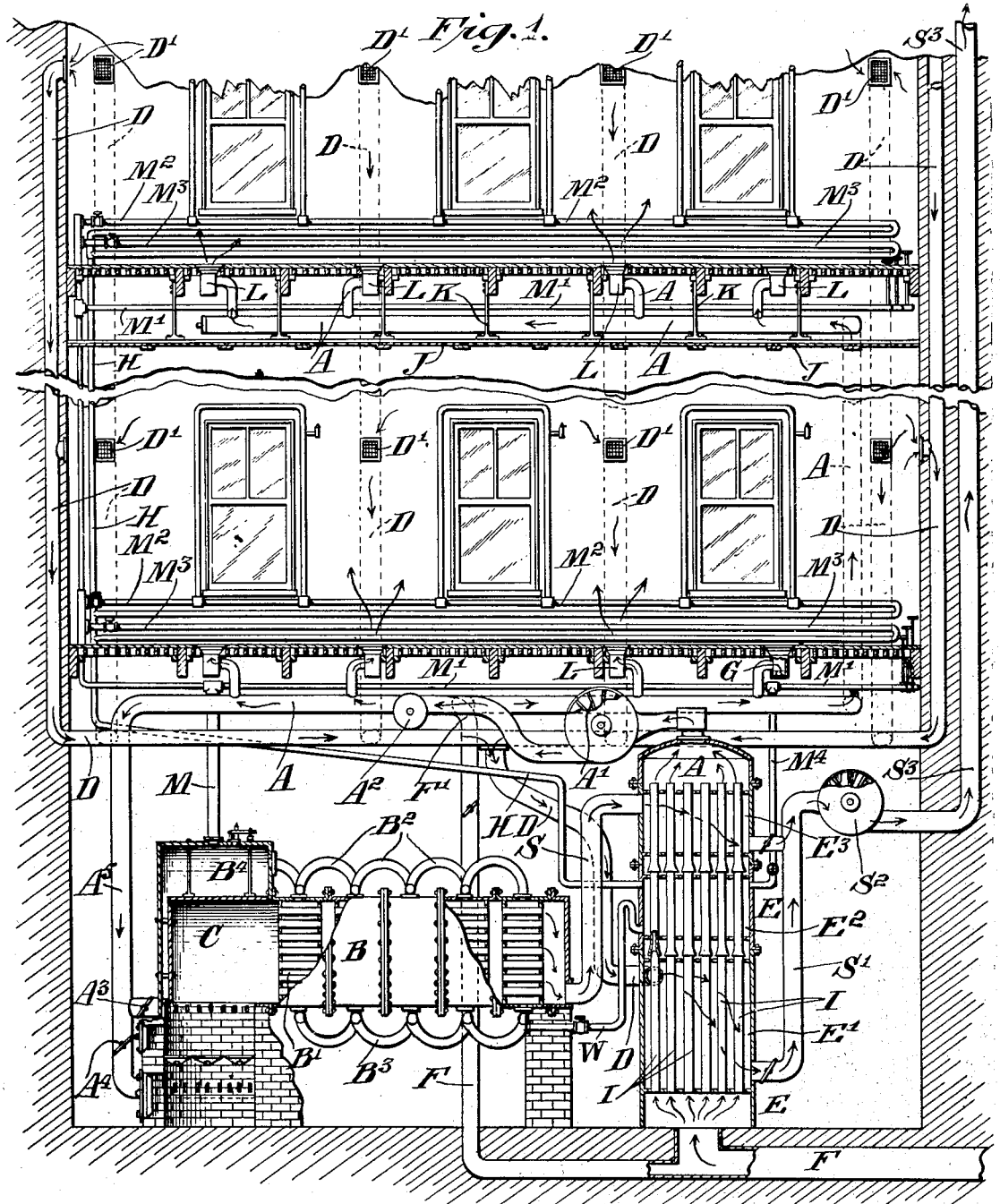
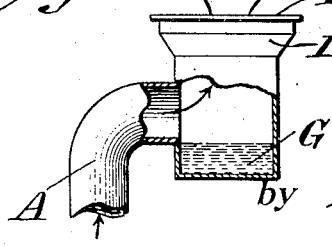
Attest:
Inventor:
J. M. W. Kitchen
by Geo. L. Wheelock
Atty

UNITED STATES PATENT OFFICE.

JOSEPH MOSES WARD KITCHEN, OF EAST ORANGE, NEW JERSEY.

HEATING SYSTEM.

1,024,788.

Specification of Letters Patent. Patented Apr. 30, 1912.

Application filed March 13, 1907. Serial No. 362,162.

*To all whom it may concern:*

Be it known that I, JOSEPH MOSES WARD KITCHEN, a citizen of the United States, residing in the city of East Orange, county of Essex, State of New Jersey, have invented new and useful Improvements in Heating Systems, of which the following is a specification.

The object of my invention is to secure desirable hygienic conditions in buildings occupied by human beings, and to secure economy in the heating of such buildings.

The system is particularly designed for use in school houses, churches, theaters, office buildings and other structures in which many people congregate; but the principles involved in the invention can be used in other buildings also.

Health and comfort, as well as economy, are essential qualities in a good heating system. In providing for these three requirements I, in my invention, apply the following principles: (1) that a sufficient volume of air for respiration should be introduced into the spaces heated; (2) that the air for respiration should be sufficiently heated to avoid cold drafts in its introduction; (3) that the air should not be heated to any higher degree than is necessary, as the respiration of moderately cool air is healthful; (4) that so far as possible, the air heated should not be made the conveyer of the heat needed to counteract the external radiation of heat from the building and from leakages of cold air into the building; (5) that the provision for making good the heat lost from the building should be a separate provision from that used for heating the air for respiration; (6) that the provision referred to for making good the losses from radiation should provide for a wide variation in the amount of heat brought to bear to counteract wide variations in external atmospheric temperature; (7) that a regenerative use be made of the heat artificially created in the building from the heating apparatus, and also from the chemico-physical heat generated and given off from the human beings in the building, and that the low degrees of heat conveyed in waste heating gases and the latent heat of steam used for motive or other purposes be economized; (8) that the heat be distributed in large volumes of low temperatures in as diffused a manner as possible; and (9) that air once heated and breathed should not be twice used for respiratory purposes.

To secure the application of the principles above enumerated, I provide in my invention as follows: (A) a steam generator having special structure for absorbing low degrees of heat from the heating gases into specially cooled feed water, for securing a perfected combustion, for utilizing low cost fuel, and for securing an equalized rate of combustion; (B) a steam radiating system the piping of which is distributed to parts from which much heat is radiated such as side walls, around windows, across the ceilings below sky-lights; and in particular, beneath floors for the purpose of heating the floors uniformly and to secure a large aggregate radiation of the heat radiated from the floor surfaces into a diffused large volume of air. This radiating system of piping is divided into sections, to each section of which the entrance of steam is controlled by a valve pertaining to the special section controlled. With this provision, any amount of direct heat radiation can be effected at any desirable location in the system; (C) an air distributing system composed of a motor-actuated fan and air distributing flues or conduits running to each floor of the building and carried beneath each floor, dividing into many sub-branches which find exit through the floors by numerous register outlets equably distributed over the floor surface; thus securing equal purity of air for all occupants; (D) provision is made for heating the air for respiration with the waste heat of the gases of combustion that leave the generator, with the heat of the water of condensation from the steam pipes of the system, with the effete respired air in the building, and if necessary, with live steam directly supplied from the steam generator; (E) provision is made for partially heating the floors with the effete respired air of each apartment or room below the floor heated. This provision is carried out by having the flooring material of good heat-conducting qualities, and by collecting the effete heated air in the higher levels of the room occupied, where it stays under the action of the force of gravity until some of its heat is conveyed to the floor above it, or until it is drawn out through special avenues, which I usually provide in the side walls of the apartment or room heated at a level several feet above the heads of such people as may be standing. In this way I secure a proper supply of fresh air of the right temperature; and do not have any air reinspired which has once been respired; (F) the means I use for heating the newly introduced air is usually vertically disposed air tubes passing through a sectional economizer through which tubes the air for respiration is drawn from a low level to a high level by a mechanically actuated fan, which also forces the air to the several occupied spaces of the building. The air is progressively heated in its upward travel, first through effete warm air, then through strata of water of condensation, then through strata of waste gases of combustion, and also through strata of live steam if any additional heating of the air is needed. In a convenient part of the conduit for the newly warmed fresh air, I provide a device F' for diluting the warmed air with cold fresh air, for the purpose of regulating accurately the temperature of the air. The device $F^1$ is the damper controlled outlet of a conduit which connects with the main air conduit F. I also introduce in the system means for measuring the amount of air introduced into the building; (G) I provide a conduit for conveying some of the warmed fresh air to the steam generator for air for combustion. (H) I also use a fan for inducing a draft through the passages of the steam generator and the passages of the air-heating economizer, each section of which is controlled by a proper valve or damper; (I) in those rooms which are occupied I introduce for æsthetic effect a false or secondary ceiling, which is made of thin metallic sheets attached to a frame-work dependent from the beams of the floor above. This secondary ceiling hides the lines of steam pipes and air conduits which are hung from the beams. It allows for some of the heat of the effete air being conveyed through the thin metallic ceiling to the under side of the flooring above it.

In the drawings Figure 1, represents an elevational view of my heating system as installed in the basement and two floors of a building; some of the parts being in section. Fig. 2, shows an elevational view partly in section of a register, catch basin and air outlet.

The reference characters represent as follows:—A, air passages for conveying fresh warmed air. $A^1$, a fan for forcing air throughout the building. $A^2$, an air meter. $A^3$, a damper for controlling the supply of air for combustion, introduced above the fuel mass. $A^4$, a damper for controlling the under grate air supply. $A^5$, a duct for warmed air for combustion.

B, represents a boiler or steam generator. $B^1$, a section of the boiler B. $B^2$, represents steam conducting pipes. $B^3$, feed water pipes. $B^4$, is a steam dome. C, a combustion chamber. D, foul air ducts. $D^1$, entrances to the ducts D. E, an air heating economizer. $E^1$, is a section of the economizer E, for economizing the heat of the respired air of the spaces occupied in the building. $E^2$, is a section for economizing the heat of water of condensation. $E^3$, is a section for economizing the waste heat of gases of combustion. F, is an air flue for introducing cool air into the system. $F^1$, is an air injecting device for cool air. G, is a catch basin. H, is a return pipe for water of condensation. I, are air-heating tubes. J, is a suspended ceiling. K, is a suspension frame. L, is a register outlet. M, is a steam main or conduit. $M^1$, is a secondary steam conduit. $M^2$, is a sectional steam conduit. $M^3$, is another sectional steam conduit. $M^4$, is a pipe for conveying live steam. R, is a register face. S, is a smoke conduit. $S^1$, is an exit conduit. $S^2$, is an induction fan. $S^3$, is a waste gas exit-flue. W, is a feed water pipe for the boiler B.

The steam generator B has a furnace provided with a high-run combustion chamber C and is arranged for supplying warmed air for combustion both above and below the fuel mass.

In this type of furnace a complete combustion can be effected, and low priced bituminous fuel can be used. By having the heat transmitting parts of the generator in sections as shown, and by introducing cool feed water at a low level of all of the sections, and conveying the feed water from below upward through the sections, and carrying out from each section at a high level the steam formed in each section, and having the gases travel progressively away from the combustion chamber and then take a downward plunge to a low level gas exit in the section most remote from the furnace, a progressive and almost complete absorption of the heat generated in the generator is secured.

The steam generated in each of the sections $B^1$, is conveyed through the steam pipe $B^2$ into the steam-dome $B^4$.

The gases of combustion after passing through the sections $B^1$ pass into the smoke conduit S which is connected with the boiler at a low level. The waste gases are conveyed by the smoke pipe S into the top of the economizer section E³, and under the influence of the induction fan S², are drawn downwardly through E³, and are finally delivered to the waste conduit S³.

The steam generated in the boiler B is distributed through the system by way of the steam main M, and the secondary conduits M¹, M² and M³.

In the steam distributing system the piping is divided in sections each of which sections is controlled by a valve, so that one or more of the sections can be brought into use at the same time, or excluded as radiating surface. Under the several floors each section of piping is run so that there is a substantially uniform distribution of the radiated heat under each floor; the total amount of heat radiated being governed by bringing one or more sections into action. In ordinary practice it is desirable to have at least three sections of piping in the system. Those surfaces of the building which are exposed to special degrees of radiation are also supplied with direct steam radiating sections individually controlled by suitable valves.

The water of condensation from the entire system of radiating pipes is conveyed to the economizer section E² through the pipe H.

The water of condensation is kept at a uniform level in the economizer section E² by carrying the water pipe W upward to the water level maintained, and thence by a bend and return in the pipe W is connected at a low level with the various sections of the boiler B. In this way the hot water of condensation is cooled in the economizer section E² as fresh air for respiration travels upward through the water in the air heating pipes I. The water of condensation is progressively cooled by the air and is then passed into the lower parts of the boiler sections B¹ through the pipes B³; thus providing feed water in the boiler sections having a sufficiently low temperature to absorb much heat from the heating gases that would be otherwise lost if the water of condensation was returned directly to the boiler without cooling.

Fresh air for respiration and adjunct heating is conveyed from the air flue F up through all of the economizing sections E¹, E², and E³; being progressively heated in its travel from below upward, and is then forced to all parts of the building through the air ducts A by the fan A¹. The heated air may be diluted by admixture with cold air at the injecting device F¹. The amount of air delivered into the building is measured by the meter A².

The air conduits A sub-divide and terminate in numerous register outlets distributed at regular intervals in the several floors.

The register face R is movable and the catch basins G can be emptied at will. The catch basins are made fluid tight to hold antiseptic solutions.

Attention is now drawn to the construction of the floors in this system. The flooring surface is composed of a material which is a good conductor of heat and which will allow of heat being conducted through the flooring surface from the piping M¹, which is hung under the flooring from the flooring beams. I prefer that the face of the floor should be made of hard baked tiles resting on a cribiform metallic structure running between and supported by the flooring beams. The tiles are cemented together with an elastic cement. In certain places, as in aisles between seats, the hard baked tiles may be replaced by a non-resonant composition tile to reduce the noise produced in walking over the floor. I prefer that the flooring surface should be of a nature to be non-absorbent of water so that its cleansing can be done with a mop dampened with an antiseptic fluid. A flooring surface of ordinary concrete may be used. To hide the piping which is hung from the flooring beams, I construct a false ceiling J, attached to a sectional framework K. This framework is made in open panels, and these panels are closed in with thin heat conducting metallic plates which are attached to the framework in such a manner as to be removable to gain access to any part of the piping for repairs.

The heated air of respiration and of radiated heat rises to the ceiling J and is retained there under the force of gravity, being gradually drawn to the periphery of the room through the apertures D¹. Some of the heat being conveyed through the metallic ceiling J helps to heat the flooring above the piping and also helps to heat the air being passed through the air conduits A under the floors.

S² is a large induction fan which draws effete air through the openings D¹ and conduits D into the upper part of the economizer section E¹, down through that section and out through the opening at its lowest level and into and through the conduit S¹ to the fan S², from whence the effete air is forced into the external atmosphere through the exit flue S³. The fan S² also induces a draft through the steam generator B and the smoke pipe S which connects with the upper part of the economizer section E³, through which section the waste gases of combustion are drawn downwardly and out through the exit openings at a low level of the section and thence to the fan S², from which the waste gases are also forced out through the exit-flue S³. The fans A¹ and S² are actuated by motors, which are preferably driven by the electric current. In case air in passing upward through the several sections of the economizer E is not sufficiently heated by the heat wastes of the building, live steam can be introduced into the upper part of the section E² through the steam pipe M⁴.

The system of heating here shown provides for the heating of a building with a large reduction in fuel cost, as much of the heat generated in the building is used regeneratively for heating freshly introduced air for respiration and as an adjunct source of heating. A prominent feature of the system is the provision for applying much of the heat needed at the feet of the occupants of the spaces heated and for providing a relatively cool air for respiration at the level of the head, and for preventing the breathing of air again which has been once respired.

The arrows in the drawings indicate the routes of travel of the ingoing fresh air, and the outgoing effete air.

What I claim as new and desire to secure by Letters Patent, is:—

1. In a heating system, the combination of (1) a steam generator and a system of steam radiating pipes, (2) a heat economizing feed water cooler and air heater, said economizing cooler and heater being constructed to receive steam and water of condensation from said system at high levels in said economizer and for the heating of air progressively by the passing of air from a low level to a high level in said economizer, first through said water of condensation and then through said steam, (3) means for maintaining the water of condensation at a selected high level in said economizer, (4) means for drawing upwardly said air through said economizer and for its heating by passing said air first through said water of condensation, and then through said steam, and (5) means for conveying said water of condensation after its cooling to the steam generator, said combination being for the economization of low degrees of heat by the cooling of feed water to a point that will allow of a larger degree of heat being absorbed in said generator and for giving variation and increase of heat to the air pre-heated in the cooling of said water of condensation.

2. In a heating system, the combination of (1) means for economizing both the waste heat of combustion and of effete respired and heated air, (2) a motor-actuated mechanism for drawing through said means for economizing the heat of the mediums carrying said waste heat of combustion and effete air, and also (3) a motor-actuated mechanism for drawing fresh unrespired air through said means for economizing, said means for economizing being constructed to transfer said waste heat to said fresh air without contamination of said air in the travel of said air through said economizing means.

3. In a heating system, the combination of means for heating fresh air for respiration and for heating with effete air of respiration and of heat radiated in the space heated by said system, without contaminating said fresh air with said effete air, said means comprising an economizer arranged to pass fresh air in vertically rising currents through tubes in said economizer and for drawing the effete heated air downward through said economizer in counter-current to the travel of the fresh air, and having effete air conduits for drawing air from relatively high levels in the occupied spaces heated, downward to and through said economizer and finally through an exhaust conduit to the outer air through the action of a ventilating fan, and comprising also another ventilating fan and fresh air conduits for drawing the fresh air through said economizer and distributing said air equably into the habited spaces heated, the fresh air entering such spaces at low levels therein.

4. In a heating system, the combination of (1) means for generating steam, (2) means for distributing the heat of said steam, and (3) means for economizing the waste heat of gases of combustion, water of condensation and of effete air of respiration, said economizing means comprising an induction fan, means for controlling the flow of waste heat bearing mediums through sections of said economizing means, and for heating fresh air for respiratory and heating purposes.

5. In a heat economizing system, the combination of (1) a steam generator, (2) means comprising a system of steam pipes for radiating the steam generated in said generator, (3) means provided with a cavity for collecting and holding respired effete heated air, (4) means for conveying said effete heated air from said cavity to a means for utilizing the heat of said effete heated air, and (5) means for utilizing the heat in said effete heated air, said combination being for the regenerative use of heat in the heating of air for such purposes as for combustion or for respiration, and for thus economizing heat that is usually wasted in heating processes.

6. In a heating system, the combination of (1) a steam generator, (2) a radiating system for radiating the heat generated in said generator and heating air for respiration, said system comprising piping in sections, each section being controlled separately by a valve, and (3) means comprising a fresh air heater and effete air cooler, and a mechanically actuated ventilating fan for regeneratively heating fresh air for respiration or combustion with the heat of once respired air and for conveying and distributing the heated fresh air.

7. In a heating system, the combination with a habitable building of (1) a vertical counter current heat-exchanger for heating fresh unrespired air with the waste heat of air heated by bodily respiration and radiation, and (2) a mechanical exhauster and blower for drawing the fresh air through the heat interchanger and forcing the heated fresh air into desired parts of the building.

8. In a heating system, the combination with a habitable structure of (1) means for radiating heat directly in the habitable spaces of said building, (2) means for heating fresh air and conveying said air into the habitable spaces of said building, and (3) means for economizing regeneratively substantially all the waste heat of the air that has been respired in said building and of air that has been once heated in said building, said last named means comprising provision for the absorption into fresh air conveyed into said building for respiration or combustion of the heat of air that has been respired and heated in said building, said transferrence of heat from said effete air to said fresh air being performed without contamination of said fresh air with said effete air.

9. In a heating system, the combination of (1) a floor having a surface of heat convective mineral composition for the quick convection of heat through said surface, (2) means comprising piping for circulating a heat bearing medium for distributing and radiating heat in a diffused manner close to and under said floor, (3) air conduits for the conveyance and equable distribution of air under said floor, (4) secondary air conduits connected with said conduits, opening through the surface of said floor and distributed equably over the area of said floor for the equable conveyance of air through said apertures and the equable diffusion of fresh air above said floor, (5) catch basins for said air apertures for holding an antiseptic fluid and catching and holding in said fluid dirt and dust dropping through said apertures, and (6) a sectional metallic ceiling suspended below said means for distributing and radiating heat and said air conduits for hiding said radiating and distributing means from view.

10. In a heating system, the combination with a habitable building of (1) a floor, said floor having a surface of good heat convective material, (2) conduits suspended below said floor and near to said floor for conveying a heat conveying medium, said floor being provided with openings for pasisng air through said floor, said openings being equably distributed over the area of said floor, (3) a ceiling suspended below said floor and said conduits for closing in and concealing said conduits, said ceiling being in movable sections, (4) an apartment below said suspended ceiling, said apartment comprising peripheral walls, (5) means near to said walls for heating the apartment at points where the peripheral walls radiate much heat to the outer atmosphere, said last named means comprising sectional radiating surfaces and means for separately controlling each section of said radiating surfaces, (6) air conveying conduits in said walls for ventilating said apartment, and (7) apertures for air connecting the conduits in said walls with said apartment, said apertures being located at a level above the altitude of the persons occupying said apartment, but at a sufficiently low level below said ceiling to allow for the collection and retention of warm air against said suspended ceiling, said suspended ceiling comprising means for transmitting heat through said suspended ceiling.

11. In a heating system, the combination of a floor having good heat convective qualities, said floor having air ducts therethrough, (2) a system of heat radiating piping suspended below said floor for diffusedly heating said floor, (3) a boiler for generating the heat distributed through said piping, (4) a sectional ceiling suspended below said piping, (5) an apartment above said convective floor, said apartment having air conduits in its peripheral walls and secondary air conduits connecting the first named air conduits and the space in said apartment at a level above the height of the occupants of said apartment, (6) an economizing heat interchanger for heating cool fresh air with the effete respired air, waste heat of exhaust gases from said boiler, and low degrees of heat of the heating medium that has circulated through said piping, said heat interchanger progressively heating the cool air in an upward travel of the cool air through the heat interchanger, (7) a mechanically actuated fan for securing a flow of the air through the heat interchanger, said air conduits in said floor, said apartment and said conduits in the walls of the apartment, (8) a ventilating fan for drawing the effete respired air from the apartment and for forcing the effete air through the heat interchanger in countercurrent travel to the flow of the fresh cool air and for forcing the effete air into the outer atmosphere, (9) means for diluting with fresh cool air other air heated in said heat interchanger, and (10) means for forcing the heated air from the heat interchanger to said boiler for purposes of combustion.

12. In a heating system, the combination with a habitable structure of (1) means for heating air and for distributing said air in said habitable structure for purposes of respiration and heating, said habitable structure comprising at a high level of said structure means forming a concavity for intercepting and holding the warmed air that has been introduced in said structure, and (2) means for utilizing the heat of said air regeneratively by heating fresh cool air and for using said last named air after its heating for purposes of combustion, said last named means comprising means for the mechanical induction of air from said concavity and for forcing said warm air to a place of combustion.

13. In a heating system, the combination of (1) a steam generator, (2) a heat interchanger for heating air with the steam generated in said generator, said heat interchanger being constructed and arranged to heat said air in a vertical counter-current travel of said air and said steam through said heat interchanger, said steam being introduced at substantially the highest level of said heat interchanger and all of said air being introduced at substantially the lowest level of said heat interchanger, the air being heated progressively in its upward travel, and the heat of the steam being progressively lost to said air in the downward travel of said steam, and (3) means for utilizing the air thus heated.

14. In a heating system, the combination with a building to be heated of (1) a sectional water heating boiler, said boiler being so constructed and arranged as to secure a progressive travel of heated gases successively through the water holding sections of said boiler and a travel of water to be heated through said sections, the gases and water traveling in counter-current, the one to the other, (2) a heating system comprising heat radiating piping in multiple sections, each section being under control as to the heating medium passing through each section, some of said sections being suspended under the floors of said building for heating said floors, said system of piping returning the heating medium circulating through said piping to an economizer, (3) said economizer being constructed and arranged to heat air for respiration or combustion with the low degrees of heat in said heating medium after the circulation of said medium through said piping, and also with the heat of warm respired air, (4) a mechanically driven means for conveying fresh air through said economizer and for forcing said fresh air through said building, and (5) a mechanically driven means for withdrawing effete respired air from said building through said economizer and forcing said air to the outside of said building.

15. In a heating system, the combination with a boiler, a system of heat distributing piping, a system of air introducing and air exhausting conduits, a fresh air exhausting and blowing fan, and an effete air exhausting and blowing fan, of an air heating economizer, said economizer comprising means for the primary heating of fresh air for respiration with water that has lost heat in passing through said piping and said economizer, said economizer comprising means for the higher heating of the air for respiration by a higher degree of heat of the heating medium that has been heated in said boiler, said economizer comprising means for the further heating of said air with the heat of the gases that have passed through said boiler, Signed at New York, N. Y., this 11th day of March, 1907.

JOSEPH MOSES WARD KITCHEN.

Witnesses:
GEO. L. WHEELOCK,
OLIVE B. KING.